United States Patent [19]
Dorman

[11] 3,838,601
[45] Oct. 1, 1974

[54] MANOMETER SYSTEM FOR MONITORING PRESSURE IN A PARTICLE STUDY DEVICE

[75] Inventor: Ervin L. Dorman, Hialeah, Fla.
[73] Assignee: Coulter Electronics, Inc., Hialeah, Fla.
[22] Filed: May 3, 1973
[21] Appl. No.: 356,733

[52] U.S. Cl. .............................. 73/401, 324/71 CP
[51] Int. Cl. ............................................. G01l 7/18
[58] Field of Search .................... 73/401; 324/71 CP

[56] References Cited
UNITED STATES PATENTS
2,869,078   1/1959   Coulter et al. ........................ 73/401

*Primary Examiner*—Donald O. Woodiel
*Attorney, Agent, or Firm*—Silverman & Cass

[57] ABSTRACT

The manometer system includes a glass tubing having a U-shaped segment therein forming a manometer. One end of the tubing is connected to a vacuum line or a pressure line and the other end of the tubing is vented to atmosphere. The manometer is partially filled with mercury. The first leg of the manometer is in communication with the first end of the tubing and the second leg is in communication with the second end of the tubing with the bight portion therebetween. The second leg has an enlarged diameter portion therein intermediate the bight portion and the upper end of the second leg. The portion of tubing immediately above the enlarged diameter portion is filled with a lightweight fluid and includes a pressure indicating section. The mercury meniscus in the second leg is situated within the enlarged diameter portion so that when there is movement of the mercury meniscus in the enlarged diameter portion, there will be a much larger movement of the lightweight fluid meniscus in the pressure indicating section. A choke is connected to the second end of the tubing to dampen movement of the lightweight fluid meniscus in the pressure indicating section and to inhibit if not prevent rapid escape of mercury should a sudden increase in pressure be applied to the first end of the tubing.

8 Claims, 2 Drawing Figures

PATENTED OCT 1 1974　　　　　　　　　　　　　3,838,601

MANOMETER SYSTEM FOR MONITORING PRESSURE IN A PARTICLE STUDY DEVICE

BACKGROUND AND SUMMARY OF THE INVENTION

The present invention relates to fluid pressure monitoring devices of the manometer type and particularly to a manometer system which is utilized in monitoring small changes in pressure. More specifically, the present invention relates to a manometer system for monitoring pressure in a particle study device of the type presently classified in class 324, sub-class 71.

Manometer systems for measuring or monitoring changes in fluid pressure are very well known and presently classified in class 73-401. In one such system, a U-shaped tube is partially filled with a fluid and one end of the tube is connectable through a valve to a fluid line having a pressure or vacuum therein which it is desired to measure or monitor and the other leg of the U-shaped tube is open to the atmosphere. Scale markings are provided on the other leg. The location of the meniscus in the second leg in the area of the markings serves as an indication of the pressure or vacuum being applied to the meniscus in the first leg.

It has also been proposed to provide means for magnifying the pressure sensed in the one leg of the U-shaped tube of the manometer so that small changes in pressure can be easily monitored or measured. One such manometer system providing higher sensitivity by magnification utilizes mercury for the sensing fluid. The second leg, open to atmosphere, has an enlarged diameter portion intermediate the bight portion and the open end of the second leg. The mercury meniscus in the second leg is situated within the enlarged diameter portion and a lightweight fluid is situated in the second leg filling the rest of the enlarged cross-section portion and extending upwardly into the tube. When a change in pressure causes a change in the level of the meniscus in the first leg, a corresponding change will occur in the mercury meniscus in the second leg. However, in view of the difference in cross-section between the mercury meniscus in the second leg and the lightweight fluid meniscus, and the corresponding differences in volume displacement, a small change in the height of the mercury meniscus in the second leg results in a large change in the height at the lightweight fluid meniscus. The scale markings of the manometer are located on the portion of the tube above the enlarged diameter portion and the meniscus of the lightweight fluid is located in the area of the scale markings.

The above described fluid pressure magnifier is particularly useful in monitoring the vacuum or pressure applied to a vessel in a particle study device of the type disclosed in U.S. Pat. No. 3,549,994. Such a particle study device includes a larger vessel within which a smaller vessel connected to vacuum or pressure is partially emersed. An aperture is provided in the wall of the smaller vessel and when vacuum is applied to the smaller vessel, fluid is drawn from the larger vessel through the aperture into the smaller vessel. In the use of the particle study device, the liquid in the larger vessel contains particles and a quantity of the liquid containing particles is drawn through the aperture for the purpose of studying the particles. This is accomplished by sensing the particles as they pass through the aperture which has a very small diameter. The technique of analyzing or studying particles by sensing the particles as they pass through an aperture of small dimension is commonly referred to as the Coulter principle which was first disclosed in U.S. Pat. No. 2,656,508.

It is to be appreciated that it is often desirable to know exactly how much fluid has been drawn through the aperture so that a determination of the concentration of particles per unit of liquid sample can be obtained. This can be accomplished by maintaining a substantially constant flow rate and then, knowing the cross-section of the aperture and the constant flow rate, and measuring the time during which particles are sensed one can multiply the flow rate by the cross-section of the aperture by the time elapsed, to determine the volume of liquid sample which has been studied.

In the particle study device disclosed in U.S. Pat. No. 3,549,994, the manometer system is connected to the vacuum line leading to the smaller vessel. So long as the vacuum applied to the smaller vessel is relatively constant, the flow rate of liquid sample through the aperture will be relatively constant. Accordingly, the manometer system with magnification is utilized in monitoring the vacuum applied to the second vessel. In this system, however, the fluid line which supplies vacuum to the smaller vessel is connectable through a valve arrangement to a source of pressure. Occasionally, this valve is inadvertently operated to connect fluid pressure to the fluid line. This results in a relatively high fluid pressure being applied to the fluid magnifier resulting in the rapid ejection of the lightweight fluid and mercury from the open end of the manometer. When this occurs, not only is a mess created but also harmful mercury is ejected into the environment. Additionally, the particle study device must then be returned to the manufacturer for reloading the manometer with mercury and lightweight fluid.

Also, inasmuch as the fluid pressure magnifier of the manometer is very sensitive, fluctuations in the height of the lightweight fluid meniscus are somewhat erratic with overshoot of the meniscus sometimes occurring. This, of course, adversely affects the proper monitoring of the vacuum being applied to the smaller vessel of the particle study device.

The manometer system of the present invention overcomes the above described disadvantages by controlling the escape of, i.e., by throttling the flow of, fluid from the second leg of the manometer.

Although manometers with fluid flow restriction means associated therewith, such as, a narrow opening in a fluid pressure line connected to the manometer, restricted openings communicating with both legs of the manometer or a porous plug in one leg of the manometer have been previously proposed, a manometer system of the type disclosed in further detail below having magnifying means and a choke and being particularly adapted for use in a particle study device has not heretofore been proposed. Examples of manometers with fluid flow restricting means are found in the following:

| U.S. Patent | Class |
|---|---|
| 998,916 | — |
| 1,394,031 | — |
| 1,419,388 | — |

-Continued

| U.S. Patent | Class |
| --- | --- |
| 1,549,039 | — |
| 1,642,615 | — |
| 2,228,023 | 73-31 |
| 2,655,045 | 73-401 |
| 3,122,924 | 73-401 |
| 3,326,048 | 73-401 |

DESCRIPTION OF THE PREFERRED EMBODIMENT

Figure 1:
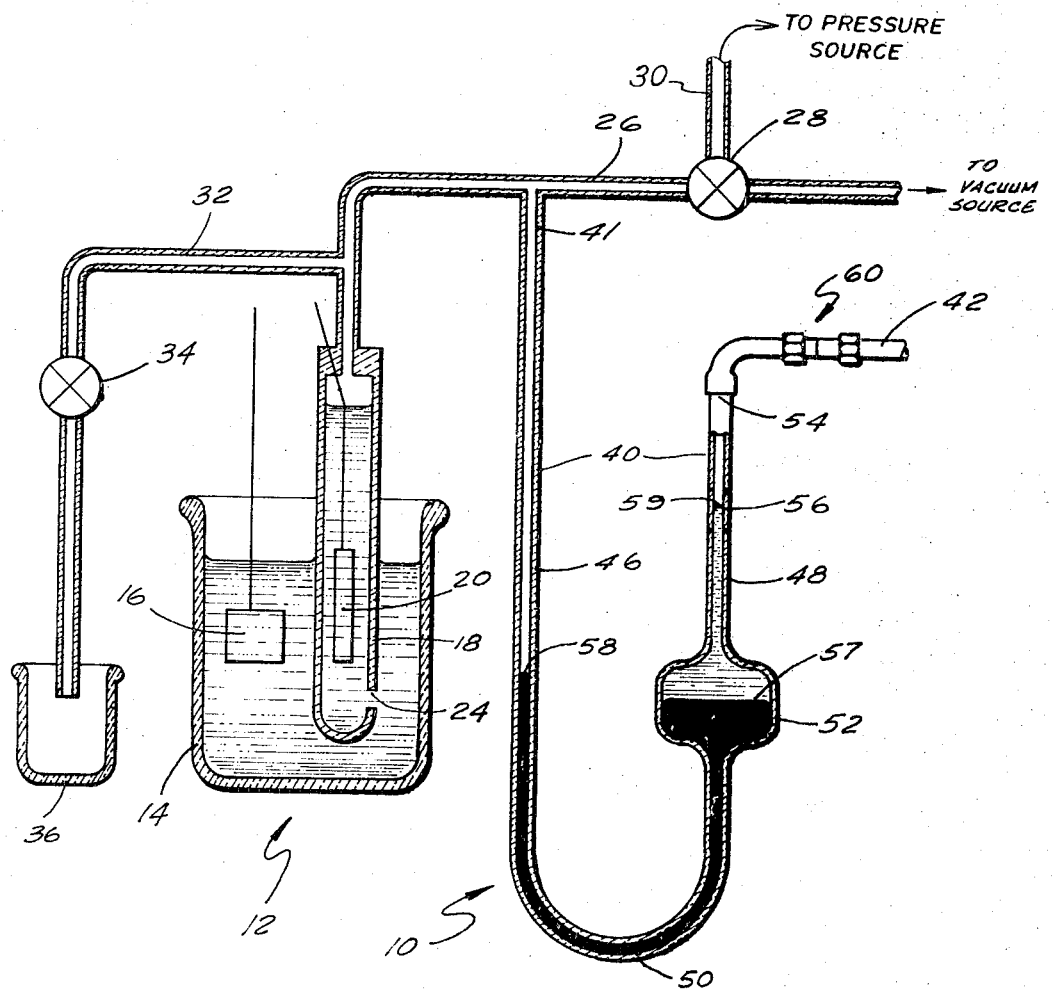
FIG. 1 is a vertical sectional view taken through a manometer system connected to a particle study device, portions of the system and device being shown diagramatically.

The manometer system is generally identified by the reference numeral 10 in FIG. 1 and is connected to a particle study device of the Coulter type, a portion of which is shown in FIG. 1. The portion shown is commonly referred to as the Coulter stand, is generally identified by the reference numeral 12 and includes a first vessel 14 having an electrode 16 extending therein and a second vessel 18, smaller than the first vessel, partially emersed in the first vessel 14. The second vessel also has an electrode 20 extending therein. An aperture of very small dimensions is provided in the wall of the second vessel and is shown schematically at 24 in FIG. 1.

As shown, the upper end of the second vessel 18 is connected via a fluid vacuum line 26 through a control valve 28 to a source of vacuum. The valve 28 is also connectable to a pressure line 30. At a point just above the second vessel an overflow line 32 is connected to the vacuum line and communicates through a check valve 34 to a container 36 which serves as a reservoir or sump for liquid which may be drawn by vacuum into the vacuum line.

According to the Coulter principle, a quantity of liquid containing particles in the first vessel 14 is drawn from the first vessel 14 through the aperture 24 into the second vessel 18 by applying vacuum to the second vessel 18. When particles in the liquid pass through the aperture 24, they are sensed electrically by the electrodes 16 and 20. In this regard, a signal is generated by each particle passing through the aperture 24. These signals are commonly referred to as particle pulses and are analyzed by suitable electronic circuitry (not shown) connected to the electrodes.

The manometer system 10 includes a conduit or tubing 40 including glass tubing portions and flexible plastic tubing portions and having a first end 41 connected to the vacuum line 26. The system 10 is utilized in monitoring the vacuum applied to the second vessel 18 so that an operator of the particle study device can be certain that a substantially uniform vacuum is applied to the second vessel 18 whereby a fairly accurate determination can be made of the amount of sample drawn through the aperture 24 while particles are being sensed. A second end 42 of the tubing 40 is open to atmosphere. As shown, the tubing 40 includes a U-shaped manometer forming portion 44 which is situated in a generally upright or vertical position. The manometer 44 includes a first leg 46, a second leg 48 and a bight portion 50 therebetween with the first leg 46 being in communication with the first end 41.

The second leg 48 has an enlarged diameter portion 52 therein intermediate the bight portion 50 and an upper end 54 of the second leg 48. The section of tubing above the enlarged diameter section 52 is generally identified by the reference numeral 56 and constitutes a pressure indicating section.

The manometer is partially filled with mercury such that a mercury meniscus 57 in the second leg 48 is located or situated in the enlarged diameter portion 52. A mercury meniscus 58 in the first leg 46 is located at approximately the same height as the mercury meniscus 57 in the second leg. However, the mercury meniscus 57 in the second leg 48 will be slightly lower than the mercury meniscus 58 in the first leg 46 since a lightweight fluid is situated in the second leg 48 filling the remainder of the enlarged diameter portion 52 and extending into the indicating section 56.

It will be understood that pressure or vacuum acting on the mercury meniscus 58 in the first leg 46 will cause a change in the vertical position thereof and a corresponding change will take place in the mercury meniscus 57 in the second leg 48. The diameter of the tubing in the indicating section is, of course, much less than the diameter in the enlarged diameter portion 52. As a result, a change in the level of the meniscus in the enlarged diameter portion will cause a much larger change in the position of a meniscus 59 of the lightweight fluid in the indicating section 56. In this way, small changes in the mercury menisci 57, 58 will result in a relatively large change in the lightweight fluid meniscus 59 and this change can be easily observed and monitored.

Figure 2:
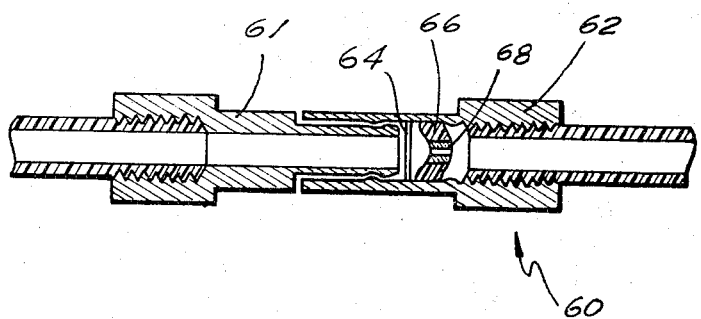
FIG. 2 is a sectional view of a choke connected to the second end of the manometer system.

According to the teachings of the present invention the manometer system 10 include a choke 60 connected at the second end 42 of the tubing 40. The choke 60 is essentially a reduced diameter passageway which serves to throttle any fluid escaping from the second end 42 of the tubing 40. Although the choke 40 can consist in any type of restricted flow device, one preferred device is a flow restrictor of the type sold by Norgren Fluidix of Littleton, Colorado, and commonly used in fluidic circuitry. A restrictor of this type is shown in FIG. 2 and includes two fittings, 61 and 62, for connecting the choke 60 into the tubing 40 at the end 42. Positioned within the fittings 61, 62 is a screen 64 and a plug 66 of plastic material within which is mounted a high precision sapphire orifice 68 having a diameter much smaller than the diameter of the tubing 40.

In one working model of the manometer system 10, a Norgren No. 6 restrictor was utilized. This restrictor had an orifice 68 with a diameter of 0.006 inch. Using this restrictor for the choke 60 resulted in a number of advantages, First of all, it was found that mercury with its high density would not flow through the small 0.006 inch orifice even when a pressure of 25 PSI was applied from line 30 through valve 28 to the mercury meniscus 58 in the first leg 46. In actual use, the pressure which can be accidentally applied to the manometer system 10 is typically 5 PSI. Thus, a choke having a restriction of 0.006 inch provides a 5:1 safety factor for preventing mercury from escaping from the manometer system in a particle study device of the type disclosed in U.S. Pat. No. 3,549,994. Accordingly, the choke 60 not only minimizes the spillage of liquid, but more importantly prevents escape of mercury thereby preventing contamination of the environment with mercury, which is harmful to human life.

Another advantage obtained with the choke 60 is that movement of the lightweight fluid meniscus 59 is damped, whereby overshoot of the meniscus is minimized, if not altogether eliminated, resulting in a more accurate monitoring of fluid pressure changes in the vacuum line 26.

A further advantage is that in transit, where the manometer system of the particle study device may be moved around and accidentally turned over, the choke 60 prevents escape of mercury.

From the foregoing description, it will be readily apparent that the manometer system of the present invention provides a number of advantages, some of which have been described above and others of which are inherent in the invention.

Also, it will be obvious to those skilled in the art that modifications can be made to the manometer system 10 without departing from the spirit or scope of the invention. In this respect, the choke can be built into the tubing or conduit 40 if desired instead of being mounted at the second end 60 of the conduit 40. Accordingly, the scope of the invention is only to be limited as necessitated by the accompanying claims.

What it is desired to secure by letters Patent of the United States is:

1. A manometer system particularly adapted for monitoring pressure in a particle study device which includes a first vessel with fluid therein, a smaller second vessel with fluid therein, an aperture through the wall of the second vessel, and means for applying a vacuum or pressure to the second vessel to cause relative fluid flow between the first vessel and the second vessel through the aperture, said manometer system including a generally vertically disposed, U-shaped manometer forming tubing having a first leg, a second leg and a bight portion therebetween said first leg being connected to said vacuum applying means, a portion of said second leg having an enlarged cross-section, the remaining portion of said second leg above said enlarged cross-section portion being of reduced cross-section and including a pressure indicating section, the free end of said second leg being vented to atmosphere, said tubing being partially filled with mercury with the meniscus of mercury in said second leg being located in said enlarged cross-section portion, a lightweight fluid in said second leg above said mercury, the meniscus of said lightweight fluid being situated in said pressure indicating section such that changes in pressure against the meniscus of mercury in said first leg which causes a change in the height of the meniscus in said second leg will cause a much larger change in the height of the meniscus of said lightweight fluid by reason of the difference in volume between the enlarged cross-section portion and the indicating section, and means above said indicating section for throttling fluid flow through said tubing, said throttling means serving to dampen movement of said lightweight fluid and to prevent rapid escape of lightweight fluid and mercury if a sudden increase in pressure is applied to the mercury meniscus in said first leg.

2. The manometer system according to claim 1 including a portion of tubing above said indicating section in said second leg, said portion of tubing terminating in an open end with said throttling means being a choke mounted at said open end.

3. The manometer system according to claim 1 wherein said fluid throttling mean comprises a fluid flow restrictor having an orifice with a cross-section much less than the cross-section of said tubing above said indicating section.

4. The manometer system according to claim 3 wherein said orifice has a diameter of approximately 0.006 inches.

5. For use in a manometer system particularly adapted for monitoring pressure in a particle study device, a conduit having a U-shaped manometer forming segment therein, and having a first end and a second end, said first end of said conduit being adapted to be connected to a fluid pressure or vacuum line, said U-shaped segment of conduit including a first leg, a second leg and a bight portion therebetween, said first leg being in communication with said first end of said conduit and said second leg having an enlarged cross-section portion therein intermediate said bight portion and the upper end of said second leg, said second leg being in communication with said second end of said conduit, said second end of said conduit being vented to atmosphere and said conduit having a choke therein between said enlarged cross-section portion and said second end.

6. The fluit conduit according to claim 5 wherein said choke comprises a fluid flow restrictor having an orifice with a cross-section much less than the cross-section of said conduit above said enlarged cross-section portion.

7. The fluid conduit according to claim 6 wherein said orifice has a diameter of approximately 0.006 inches.

8. The fluid conduit according to claim 5 wherein said choke is mounted at the second end of said conduit.

* * * * *